(12) United States Patent
Tanaka et al.

(10) Patent No.: US 10,062,889 B2
(45) Date of Patent: Aug. 28, 2018

(54) LITHIUM ION SECONDARY BATTERY

(71) Applicant: MURATA MANUFACTURING CO., LTD., Nagaokakyo-shi, Kyoto-fu (JP)

(72) Inventors: Yosuke Tanaka, Nagaokakyo (JP); Manabu Sawada, Nagaokakyo (JP); Yusuke Ueba, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 157 days.

(21) Appl. No.: 14/873,059

(22) Filed: Oct. 1, 2015

(65) Prior Publication Data
US 2016/0028061 A1 Jan. 28, 2016

Related U.S. Application Data

(63) Continuation of application No. PCT/JP2014/058937, filed on Mar. 27, 2014.

(30) Foreign Application Priority Data

Apr. 12, 2013 (JP) ................. 2013-083674

(51) Int. Cl.
| | |
|---|---|
| *H01M 2/16* | (2006.01) |
| *H01M 4/13* | (2010.01) |
| *H01M 10/0525* | (2010.01) |
| *H01M 10/058* | (2010.01) |

(52) U.S. Cl.
CPC ............. *H01M 2/166* (2013.01); *H01M 4/13* (2013.01); *H01M 10/058* (2013.01); *H01M 10/0525* (2013.01)

(58) Field of Classification Search
CPC .......... H01M 10/0525; H01M 10/058; H01M 2/166; H01M 4/13
See application file for complete search history.

(56) References Cited

U.S. PATENT DOCUMENTS

| | | | | |
|---|---|---|---|---|
| 4,833,050 | A * | 5/1989 | Whitney | H01M 4/48 429/220 |
| 7,534,530 | B2 | 5/2009 | Guterman et al. | |
| 2005/0118507 | A1 | 6/2005 | Guterman et al. | |
| 2008/0254369 | A1 | 10/2008 | Inoue et al. | |
| 2010/0248026 | A1* | 9/2010 | Hinoki | H01M 4/13 429/209 |

(Continued)

FOREIGN PATENT DOCUMENTS

| | | |
|---|---|---|
| CN | 1624954 A | 6/2005 |
| CN | 102318126 A | 1/2012 |

(Continued)

*Primary Examiner* — Stewart A Fraser
*Assistant Examiner* — Victoria H Lynch
(74) *Attorney, Agent, or Firm* — Arent Fox LLP (57) ABSTRACT

A lithium ion secondary battery that includes an electrode smoothing layer formed from a composite material including an active material and an organic substance and provided on the surface of at least one of a positive electrode and a negative electrode, and a lithium-ion permeable ceramic separator layer formed from a composite material including insulating inorganic microparticles and an organic substance provided so as to be opposed to at least one of the positive electrode and negative electrode with the electrode smoothing layer interposed therebetween.

9 Claims, 3 Drawing Sheets (56) References Cited

U.S. PATENT DOCUMENTS

| | | | |
|---|---|---|---|
| 2011/0177389 A1 | 7/2011 | Endo et al. | |
| 2011/0223492 A1 | 9/2011 | Sakitani et al. | |
| 2011/0281161 A1 | 11/2011 | Ikeda et al. | |
| 2013/0183568 A1* | 7/2013 | Babinec | H01M 2/166 |
| | | | 429/142 |

FOREIGN PATENT DOCUMENTS

| | | |
|---|---|---|
| JP | 6-203819 A | 7/1994 |
| JP | 7-220759 A | 6/1995 |
| JP | 2000149906 A | 5/2000 |
| JP | 2006-164761 A | 6/2006 |
| JP | 2009-164014 A | 7/2009 |
| JP | 2010-267475 A | 11/2010 |
| JP | 2011-192395 A | 9/2011 |
| JP | 2013-30275 A | 2/2013 |
| JP | 2013030275 A | 2/2013 |
| WO | WO 2005/098997 A1 | 10/2005 |
| WO | WO 2009-087791 A1 | 7/2009 |
| WO | WO 2010/089898 A1 | 8/2010 |

* cited by examiner

LITHIUM ION SECONDARY BATTERY

CROSS REFERENCE TO RELATED APPLICATIONS

The present application is a continuation of International application No. PCT/JP2014/058937, filed Mar. 27, 2014, which claims priority to Japanese Patent Application No. 2013-083674, filed Apr. 12, 2013, the entire contents of each of which are incorporated herein by reference.

FIELD OF THE INVENTION

The present invention relates to a battery, more particularly, a lithium ion secondary battery using a ceramic separator, which is excellent in economic efficiency and high in reliability.

BACKGROUND OF THE INVENTION

Lithium ion secondary batteries are structured, for example, to have an electric storage element and an electrolyte solution housed in an exterior, where the electric storage element is configured such that a positive electrode formed by applying an active material (lithium composite oxide) for positive electrodes to a sheet-like collector foil (such as aluminum foil or copper foil) and a negative electrode formed by applying an active material (such as activated carbon or carbon) are laminated with a separator interposed therebetween for preventing short circuit by contact between the positive and negative electrodes.

Figure 4:
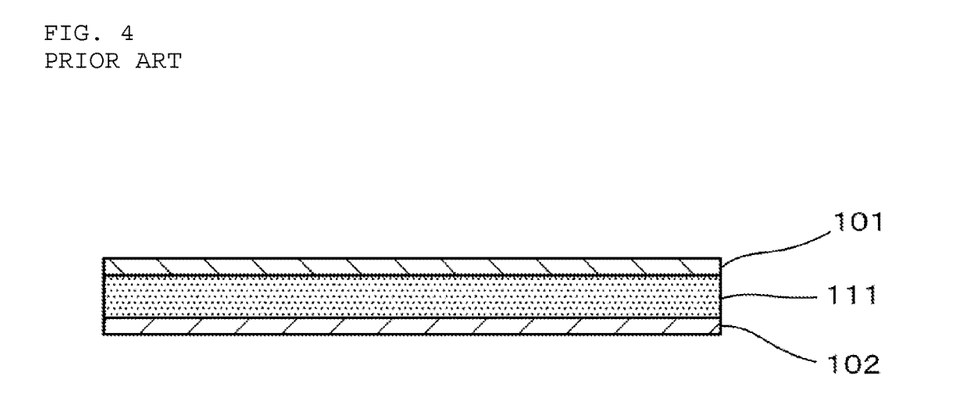
FIG. 4 is a diagram schematically illustrating the configuration of a conventional lithium ion secondary battery as disclosed in Patent Document 1.

As such a battery, Patent Document 1 proposes a non-aqueous electrolyte battery configured to have a ceramic separator layer 111 with the use of, not a separator such as a polyolefin stretched film (hereinafter, referred to as a "polyolefin separator") used conventionally, but a separator with inorganic microparticles dispersed in an organic polymer (hereinafter, also referred to as "a ceramic separator layer"), the ceramic separator layer 111 being disposed between a positive electrode 101 and a negative electrode 102 as schematically illustrated in FIG. 4.

The ceramic separator layer 111 used in Patent Document 1 is not shrunk by deformation even at high temperatures. Therefore, even when the ceramic separator layers 111 are exposed to unintended high temperatures, safety can be improved without causing short circuit between the positive electrode and the negative electrode, heat generation, smoke generation, ignition, or the like by shrinkage of the layer. For example, the safety which causes no ignition even in a nail penetration test is due to this feature.

However, there is actually no launched battery configured such that electron insulation is ensured by only the ceramic separator layer 111, because electron insulation is not able to be ensured by only the ceramic separator layer in the case of adopting an electrode with large surface asperity.

Moreover, when the ceramic separator layer is adopted to try to respond to requests for low cost and low resistance, the film thickness has to be reduced, and in the case of adopting an electrode with large surface asperity, electron insulation is not able to be ensured when the ceramic separator layer is reduced in thickness. On the other hand, while electron insulation can be ensured when the film thickness of the ceramic separator layer is increased in order to ensure electron insulation, the increased film thickness has the problem of leading to an increase in cost and an increase in resistance. As just described, low cost, low resistance, and electron insulation are actually not all satisfied in the case of the configuration shown in FIG. 4.

Figure 5:
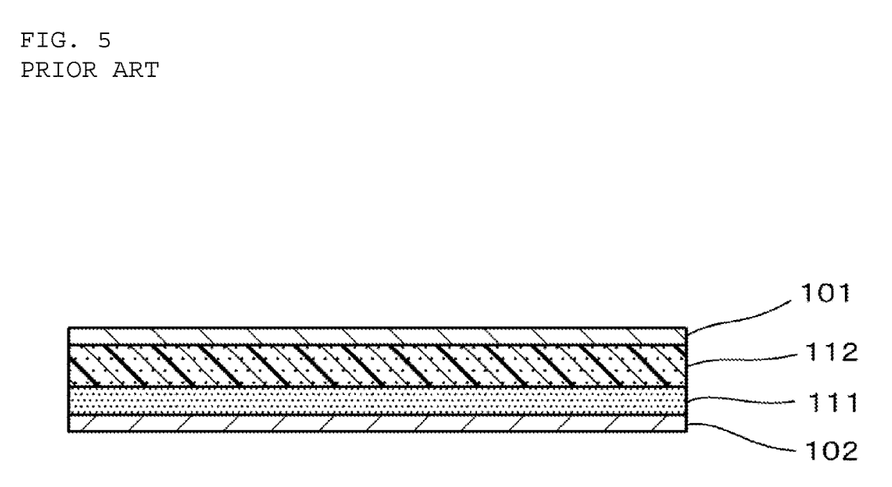
FIG. 5 is a diagram schematically illustrating the configuration of a conventional lithium ion secondary battery as disclosed in Patent Document 2.

Furthermore, Patent Document 2 proposes, as schematically illustrated in FIG. 5, a non-aqueous electrolyte battery configured to have a porous insulating layer (HRL) (substantial ceramic separator layer) 111 and a porous insulator (commonly used polyolefin separator) 112 provided between a positive electrode 101 and a negative electrode 102.

It is to be noted that the porous insulating layer 111 is formed from a mixture of insulating inorganic microparticles and a binder composed of an organic polymer, and substantially the same as the ceramic separator layer.

In the case of the configuration in Patent Document 2, the porous insulator 112 which is a polyolefin separator and the porous insulating layer (ceramic separator layer) 111 composed of a mixture of insulating inorganic microparticles and a binder of an organic polymer are interposed between the positive electrode 101 and the negative electrode 102, and short circuit between the positive electrode and the negative electrode, heat generation, and ignition are suppressed or prevented for the improvement of safety by interposing the porous insulating layer (ceramic separator layer) 111 which is not shrunk at high temperatures, while electron insulation between the positive and negative electrodes can be ensured by the porous insulator 112 which is a polyolefin separator with excellent electron insulation. However, there are the following problems because the porous insulator 112 which is a polyolefin separator is used in combination.

(a) The cost of the polyolefin separator accounts for a large percentage of the battery cost, and causes an increase in cost.

(b) The polyolefin separator is high in resistance, thereby resulting in a deterioration in power characteristics, and the reduced film thickness and the increased porosity are thus conceivable as countermeasures against the deterioration, but not easily achieved, and become strong factors in preventing high performance of the battery. Moreover, in order to ensure power characteristics, the increased number of layers stacked is conceivable, which results in an increase in cost.

(c) The polyolefin separator typically has a large film thickness of 20 to 30 μm, and has the problem of decrease in energy density per volume, and it is extremely difficult to reduce the film thickness of the polyolefin separator because of problems in handling, etc., although a higher energy density battery can be designed as the separator is reduced in film thickness.

Figure 6:
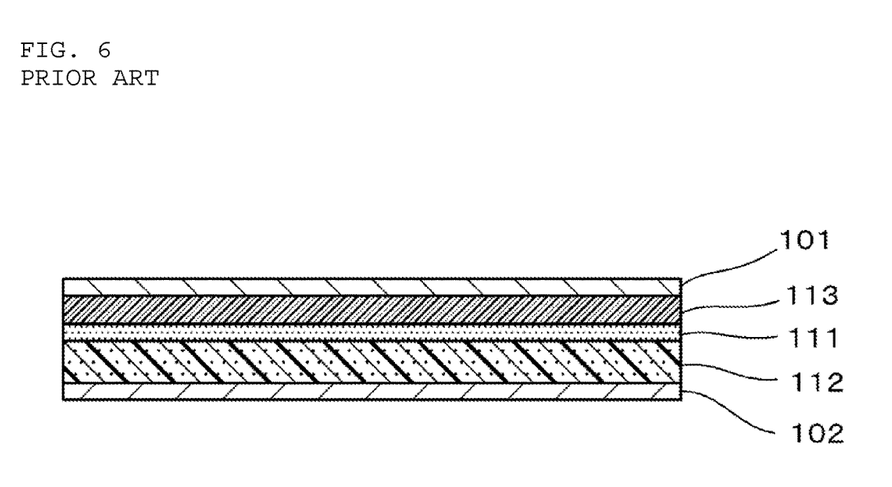
FIG. 6 is a diagram schematically illustrating the configuration of a conventional lithium ion secondary battery as disclosed in Patent Document 3.

Furthermore, Patent Document 3 proposes, as schematically illustrated in FIG. 6, a lithium ion secondary battery including: (a) a first insulating layer (ion-permeable gel) 113; (b) a second insulating layer (ceramic separator layer that has ion permeability) 111; and (c) a porous insulator (porous polyolefin separator) 112 between a positive electrode 101 and a negative electrode 102.

In the case of the configuration in Patent Document 3 herein, the problems mentioned above with Patent Document 2 are not only directly applied thereto because there are the ceramic separator layer (second insulating layer) 111 and porous polyolefin separator (porous insulator) 112 provided therein, but problems such as high cost, high resistance, a decrease in energy density, and a decrease in power density are also further grown because of the further addition of one more constituent element referred to as the ion-permeable gel (first insulating layer) 113.

Besides, proposed are: a non-aqueous electrolyte secondary battery in which a porous protective film of 0.1 to 200 μm in thickness, composed of a resin binder and solid particles, for example, is formed on the surface of either a negative electrode active material coating layer or a positive electrode active material coating layer (see Patent Document 4); a non-aqueous electrolyte secondary battery in which a negative electrode is provided with an active material layer including particles of an active material containing Si or Sn, and a layer including particles of an inorganic oxide is formed on the outermost surface; and further, a non-aqueous electrolyte secondary battery with outermost surface roughness Ra as specified in JIS B0601 from 0.1 to 3 μm (see Patent Document 5).

However, also in the case of the batteries in Patent Documents 4 and 5, porous polyolefin separators are used as the separators, and there are actually such problems as mentioned above with reference to Patent Documents 2 and 3.

Patent Document 1: Japanese Patent Application Laid-Open No. 2006-164761

Patent Document 2: International Publication WO 2005/098997

Patent Document 3: Japanese Patent Application Laid-Open No. 2010-267475

Patent Document 4: Japanese Patent Application Laid-Open No. 7-220759

Patent Document 5: Japanese Patent Application Laid-Open No. 2009-164014

SUMMARY OF THE INVENTION

The present invention is intended to solve the problems mentioned above, and an object of the invention is to provide a lithium ion secondary battery which is able to achieve a high energy density and a high power density at low cost without using a polymer separator such as a porous polyolefin separator, and excellent in terms of safety.

In order to solve the problems mentioned above, a lithium ion secondary battery according to the present invention includes: a battery element including a positive electrode, a negative electrode, a ceramic separator layer provided to be interposed between the positive electrode and the negative electrode, an electrode smoothing layer for smoothing a surface of at least one of the positive electrode and negative electrode, and an electrolyte; and an exterior that houses the battery element, in which the electrode smoothing layer is formed from a composite material including an active material and an organic substance, and provided on a surface of at least one of the positive electrode and the negative electrode; and the ceramic separator layer is formed from a composite material including insulating inorganic microparticles and an organic substance, has lithium ion permeability, and is provided to be opposed to at least one of the positive electrode and the negative electrode with the electrode smoothing layer interposed therebetween.

In addition, in the lithium ion secondary battery according to the present invention, preferably, the electrode smoothing layer is provided on surfaces of both the positive electrode and the negative electrode, and the ceramic separator layer is provided to be located between the electrode smoothing layer provided on the surface of the positive electrode and the electrode smoothing layer provided on the surface of the negative electrode.

The surfaces of both the positive electrode and negative electrode are smoothed reliably by providing the electrode smoothing layer on the surfaces of both the positive electrode and negative electrode, and providing the ceramic separator layer in such a way as to be located between the electrode smoothing layer provided on the surface of the positive electrode and the electrode smoothing layer provided on the surface of the negative electrode. Thus, surface asperity of the electrode (positive electrode or negative electrode) is kept or prevented from negatively affecting the ceramic separator layer, thereby making it possible to achieve a more highly reliable lithium ion secondary battery.

Furthermore, the active material constituting the electrode smoothing layer is preferably 0.03 to 5 μm in particle size. It is to be noted that the particles constituting the electrode smoothing layer may include secondary particles obtained from primary particles partly sintered or linked by melting and recrystallization.

The adjustment of the active material constituting the electrode smoothing layer to 0.03 to 5 μm in particle size makes it possible to sufficiently smooth the surface of the electrode, thereby making the present invention further effective.

In the lithium ion secondary battery according to the present invention, the electrode smoothing layer composed of the composite material including the active material and the organic substance is provided on the surface of at least one of the positive electrode and negative electrode, and the lithium-ion permeable ceramic separator composed of the composite material including the insulating inorganic microparticles and the organic substance is configured to be opposed to at least one of the positive electrode and negative electrode with the electrode smoothing layer interposed therebetween. Thus, even when the positive electrode or negative electrode has surface asperity, the electrode smoothing layer makes it possible to absorb the asperity of the positive electrode or negative electrode, thereby smoothing the surface, and makes it possible to keep or prevent the protrusions of the positive electrode or negative electrode from being exposed at the surface of the ceramic separator layer and short-circuited in contact with the counter electrode, thereby causing only the ceramic separator layer to ensure electron insulation between the positive and negative electrodes.

More specifically, the formation of the electrode smoothing layer including the active material of, for example, 0.03 to 5 μm in particle size and the organic substance on the electrode (positive electrode or negative electrode) makes the ceramic separator layer formed thereon less likely to have defects generated. As a result, electron insulation between the positive and negative electrodes is allowed be ensured by only the ceramic separator layer, without using a polymer separator such as a porous polyolefin separator.

In the present invention, any active material is able to be used as the active material constituting the electrode smoothing layer, for example, as an active material for the positive electrode, as long as the active material is commonly used in the art as a lithium-containing metal oxide, and examples of the active material for the positive electrode include, for example, $LiCoO_2$, $LiMn_xO_{2x}$ (x=1, 2), $LiNi_{1-x}Mn_xO_{2x}$ (0<x<1), and $LiNi_{1-x-y}Co_xMn_yO_2$ (0≤x≤0.5, 0≤y≤0.5), whereas examples of the active material for the negative electrode include $Li_4Ti_5O_{12}$, graphite-like materials such as natural graphite, artificial graphite, coke, and carbon fibers, elements that are able to form alloys with Li, such as Al, Si, Sn, Ag, Bi, Mg, Zn, In, Ge, Pb, and Ti and compounds containing the elements, or nitrides containing lithium.

However, the active material is not to be considered limited to the examples mentioned above, but it is also possible to further use other materials.

Furthermore, it is also possible for the electrode smoothing layer to further contain, besides the active material and the organic substance, solid particles such as ceramic particles.

In that case, from the perspective of ensuring the electrode smoothing effect, particles of 0.03 to 5 μm in particle size are desirably used as the solid particles. In addition, for example, insulating microparticles such as alumina, $SiO_2$, and polyethylene particles, or in consideration of electrode reaction, electron conductive carbon particles can be used as the solid particles.

It is considered to be due to the following mechanism that the present invention makes it possible to achieve the effect of being able to cause only the ceramic separator layer to ensure electron insulation between the positive and negative electrodes as described above.

The surface of the electrode (positive electrode or negative electrode) typically has asperity, and when the ceramic separator layer is provided in contact with the electrode, the surface asperity of the electrode makes the ceramic separator layer likely to have defects such as through pinholes generated, and the defects may reduce the safety of the lithium ion secondary battery.

In contrast, the formation of the electrode smoothing layer on the surface of the electrode (positive electrode or negative electrode) makes it possible to reduce the influence of the surface asperity of the electrode on the ceramic separator layers, and significantly reduces defects generated in the ceramic separator layer, thereby making it possible to achieve a safe and highly reliable lithium ion secondary battery without the need to use a porous polymer separator.

It is to be noted that the lithium ion secondary battery according to the present invention eliminates the need to use a polymer separator such as a porous polyolefin separator, and the following advantageous effects can be thus achieved.

(1) While the cost of a porous polymer separator (for example, a porous polyolefin separator) accounts for a large percentage of the cost of constituent materials of a battery, the cost can be reduced by eliminating the need for the porous polymer separator.

(2) In addition, when the lithium ion secondary battery is a stacked battery, no high-resistance polymer separator is required, thus making it possible to reduce the number of layers stacked, which is required for achieving desired power characteristics, and in that respect, also making it possible to achieve a reduction in cost.

(3) In addition, the porous polymer separator (for example, a porous polyolefin separator) typically has a large film thickness of 20 to 30 μm, and the elimination of the need for the polymer separator which is large in film thickness as just described can increase the energy density per volume (the existence of the porous polymer separator makes no contribution to the production of energy (or capacity), and the energy density can be thus improved by eliminating the need for the polymer separator).

Furthermore, in the lithium ion secondary battery according to the present invention, the electrode smoothing layer contains an active material of the composite material including the active material and the organic substance, thus making it possible to produce a battery capacity also from the electrode smoothing layer, and making it possible to achieve a high energy density and a high power density.

DETAILED DESCRIPTION OF THE INVENTION

Features of the present invention will be described in detail below with reference to embodiments of the present invention.

[Embodiment 1]

<Preparation of Lithium Ion Secondary Battery>

(Step 1) Preparation of Positive Electrode Active Material Slurry

Weighed were 88 g of lithium manganese oxide (from Toda Kogyo Corporation, HPM- 7051, average particle size $D_{50}$=6.1 μm), 2 g of graphite (from TIMCAL, KS-6), and 6 g of graphite (from TIMCAL, Super P Li).

Then, the respective materials weighed were put in a 1000 mL pot, to which PSZ grinding media of 1.0 mm in diameter and 200 g of N-methylpyrrolidone (hereinafter, NMP) as a solvent were further added. Then, dispersion was achieved by mixing for 24 hours at 150 rpm with the use of a tumbling ball mill. Thus, secondary particles of the lithium manganese oxide were crumbled to an average particle size $D_{50}$ of 2.1 μm.

The solution with the respective materials dispersed in the way described above was, with the addition of 40 g of an NMP solution of 10 mass % polyvinylidene fluoride (from KUREHA CORPORATION, #7208) thereto, further mixed for 4 hours at 150 rpm with the use of a tumbling ball mill to prepare positive electrode active material slurry.

(Step 2) Preparation of Negative Electrode Active Material Slurry

Weighed were 85 g of graphite (from Mitsubishi Chemical Corporation, GTR6, average particle size $D_{50}$=11.0 μm), 15 g of a conducting aid (from Hitachi Chemical Co., Ltd., SMSC10-4V3), 100 g of NMP, and 53 g of a 10 mass % NMP solution of polyvinylidene fluoride (from KUREHA CORPORATION, #7305), and stirred with a planetary mixer to prepare negative electrode active material slurry.

(Step 3) Preparation of Slurry for Electrode (Negative Electrode) Smoothing Layer In a 500 mL pot, 80 g of lithium titanate (from Ishihara Sangyo Kaisha, Ltd., XA-106, average particle size $D_{50}$=6.8 μm) weighed was put, and further with the addition of PSZ grinding media of 1.0 mm in diameter and 100 g of NMP as a solvent thereto, mixed for dispersion for 16 hours at 150 rpm with the use of a tumbling ball mill. Thus, secondary particles of the lithium titanate were crumbled to an average particle size $D_{50}$ of 0.8 µm. In this case, the secondary particles are not completely crumbled, but some particles are present in the form of secondary particles obtained from primary particles sintered or linked by melting and recrystallization.

Then, the solution with the respective materials dispersed as described above was, with the addition of 50 g of an NMP solution of 10 mass % polyvinylidene fluoride (from KUREHA CORPORATION, #7208) thereto, further mixed for 4 hours at 150 rpm with the use of a tumbling ball mill to prepare slurry for electrode (negative electrode) smoothing layer.

(Step 4) Preparation of Positive Electrode

The positive electrode active material slurry prepared in the above (Step 1) was applied to positive electrode collector foil of aluminum foil (from Tokai Toyo Aluminium Hanbai K.K., 20 µm in thickness), dried, and then pressed to prepare a positive electrode. Furthermore, an aluminum tab is attached to an exposed part of the positive electrode collector foil to prepare an extended electrode.

(Step 5) Preparation of Negative Electrode

The negative electrode active material slurry prepared in the above (Step 2) was applied to a negative electrode collector foil of rolled copper foil (from Nippon Foil Mfg. Co., Ltd., 10 µm in thickness), dried, and pressed to prepare a negative electrode. Furthermore, a nickel tab is attached to an exposed part of the negative electrode collector foil to prepare an extended electrode.

(Step 6) Preparation of Electrode (Negative Electrode) Smoothing Layer

The slurry for electrode smoothing layers, prepared in the above (Step 3), was applied to the negative electrode prepared in the above (Step 5) to form an electrode (negative electrode) smoothing layer. It is to be noted that the electrode (negative electrode) smoothing layer is desirably formed to be, for example, 10 µm or less in thickness.

(Step 7) Formation of Ceramic Separator Layer

In a 500 mL pot, 100 g of spherical alumina powder (from DENKI KAGAKU KOGYO KABUSHIKI KAISHA, average particle size $D_{50}$=0.3 µm) and 80 g of NMP as a solvent were put.

Further, with PSZ grinding media of 5 mm in diameter put therein, dispersion was achieved by mixing for 16 hours at 150 rpm with the use of a tumbling ball mill.

Thereafter, with 67.8 g of a binder solution (20 mass % NMP solution) of PVDF-HFP (from ARKEMA, Kynar #2850) put therein, slurry for ceramic separator layers with a PVC (pigment volume concentration) of 80% was prepared by mixing for 4 hours at 150 rpm with the use of a tumbling ball mill.

The prepared slurry for ceramic separator layers was applied with a bar coater onto the electrode (negative electrode) smoothing layer formed on the surface of the negative electrode in the above (Step 6), and then dried to form a ceramic separator layer of 11 µm in film thickness.

(Step 7) Preparation of Battery Cell

Figure 1:
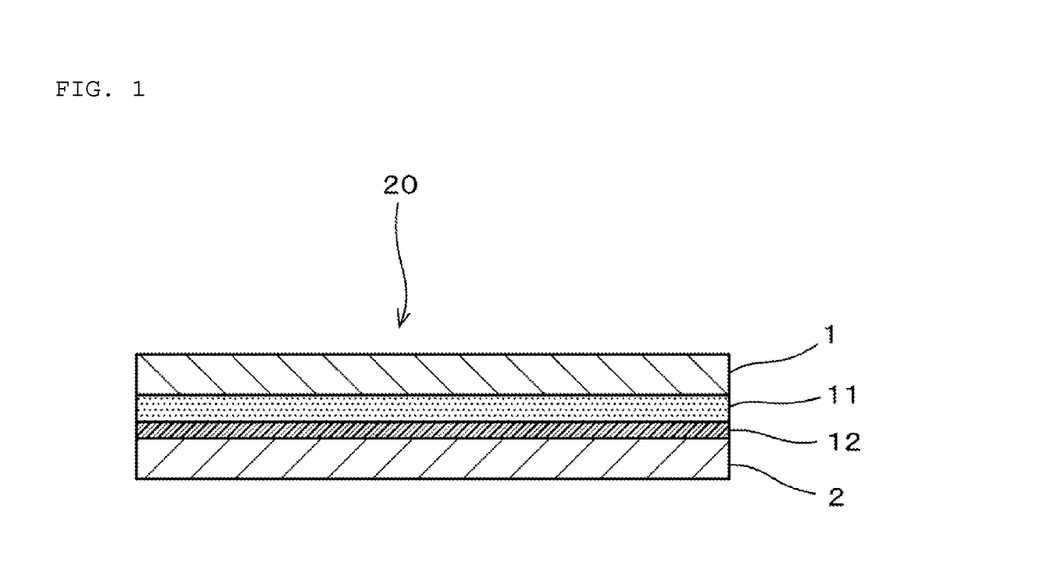
FIG. 1 is a diagram schematically illustrating the configuration of a lithium ion secondary battery (battery element) according to Embodiment 1 of the present invention.

As schematically illustrated in FIG. 1, a battery element 20 including a pair of electrodes (positive electrode and negative electrode) was prepared by opposing the positive electrode 1 prepared in the above (Step 4), and the negative electrode 2 prepared in the above (Step 7), including the electrode (negative electrode) smoothing layer 12 and the ceramic separator 11, and joining the electrodes in such a manner that the electrode (negative electrode) smoothing layer 12 and the ceramic separator layer 11 were located between the positive electrode 1 and the negative electrode 2.

Then, a laminated package (exterior) with an opening at one side was prepared by sandwiching the prepared battery element between two laminates, and making the three sides subjected to thermocompression bonding with an impulse sealer.

Next, an electrolyte solution was injected from the opening of the laminate into the package.

As the electrolyte solution, an electrolyte solution was used which was obtained by dissolving lithium hexafluorophosphate ($LiPF_6$) for 1 M in a mixed solvent of ethylene carbonate (EC) and diethyl carbonate (DEC) at a volume ratio of 3:7.

Finally, the opening of the laminated package was vacuum-sealed to prepare a lithium ion secondary battery (battery cell).

<Characterization>

In order to evaluate the characteristics of the lithium ion secondary battery (battery cell) prepared in the way described above, whether any short-circuit fault had been caused or not was confirmed for ten lithium ion secondary batteries. For the determination of the short-circuit fault, the cell was charged up to 3.8 V, and left for one week, the voltage of the cell was measured, and the cell was regarded as a non-defective product when the voltage was 3.7 V or higher, or regarded as a short-circuit fault when the voltage was less than 3.7 V. The results are shown in Table 1.

In addition, for comparison, the same evaluation was also carried out on a lithium ion secondary battery prepared by the same method, except that the electrode (negative electrode) smoothing layer was not formed in the above (Step 6) (a lithium ion secondary battery including only a ceramic separator layer between a positive electrode and a negative electrode). The results are shown together in Table 1.

TABLE 1

| Sample | Incidence of Short-Circuit Faults (Number of Short Circuits Caused/ Number of Samples) |
|---|---|
| Lithium Ion Secondary Battery according to Embodiment 1 (Lithium Ion Secondary Battery including Ceramic Separator Layer and Electrode Smoothing Layer) | 0/10 |
| Lithium Ion Secondary Battery for Comparison (Lithium Ion Secondary Battery including Only Ceramic Separator Layer, but including No Electrode Smoothing Layer) | 10/10 |

As shown in Table 1, in the case of the lithium ion secondary battery according to Embodiment 1 of the present invention, no short circuit was found to be caused in any of the ten lithium ion secondary batteries subjected to the evaluation.

On the other hand, in the case of the lithium ion secondary battery for comparison, a short circuit was found to be caused in all of the ten lithium ion secondary batteries subjected to the evaluation.

From the results mentioned above, it has been confirmed that when the electrode (negative electrode) smoothing layer is formed on the surface of the negative electrode, the surface of the negative electrode is smoothed, thereby making it possible to prevent, with only the ceramic separator, any short-circuit fault from being caused, without using any porous polymer separator.

[Embodiment 2]

<Preparation of Lithium Ion Secondary Battery>

(Step 1) Preparation of Positive Electrode Active Material Slurry

Weighed were 88 g of lithium manganese oxide (from Toda Kogyo Corporation, HPM-7051, average particle size $D_{50}$=6.1 µm), 2 g of graphite (from TIMCAL, KS-6), and 6 g of graphite (from TIMCAL, Super P Li).

Then, positive electrode active material slurry was prepared by stirring with the use of a planetary mixer.

(Step 2) Preparation of Negative Electrode Active Material Slurry

Weighed were 85 g of graphite (from Mitsubishi Chemical Corporation, GTR6, average particle size $D_{50}$=11.0 µm), 15 g of a conducting aid (from Hitachi Chemical Co., Ltd., SMSC10-4V3), 100 g of NMP, and 53 g of a 10 mass % NMP solution of polyvinylidene fluoride (from KUREHA CORPORATION, #7305), and stirred with a planetary mixer to prepare negative electrode active material slurry.

(Step 3) Preparation of Slurry for Electrode (Positive Electrode) Smoothing Layer Weighed were 88 g of lithium manganese oxide (from Toda Kogyo Corporation, HPM-7051, average particle size $D_{50}$=6.1 µm), 2 g of graphite (from TIMCAL, KS-6), and 6 g of graphite (from TIMCAL, Super P Li).

Then, the respective materials weighed were put in a 1000 mL pot, to which PSZ grinding media of 1.0 mm in diameter and 200 g of N-methylpyrrolidone (hereinafter, NMP) as a solvent were further added. Then, dispersion was achieved by mixing for 24 hours at 150 rpm with the use of a tumbling ball mill. Thus, secondary particles of the lithium manganese oxide were crumbled to an average particle size $D_{50}$ of 2.1 µm. In this case, the secondary particles are not completely crumbled, but some particles are present in the form of secondary particles obtained from primary particles sintered or linked by melting and recrystallization.

The solution with the respective materials dispersed in the way described above was, with the addition of 40 g of an NMP solution of 10 mass % polyvinylidene fluoride (from KUREHA CORPORATION, #7208) thereto, further mixed for 4 hours at 150 rpm with the use of a tumbling ball mill to prepare slurry for electrode (positive electrode) smoothing.

(Step 4) Preparation of Slurry for Electrode (Negative Electrode) Smoothing Layer In a 500 mL pot, 80 g of lithium titanate (from Ishihara Sangyo Kaisha, Ltd., XA-106, $D_{50}$=6.8 µm) weighed was put, and further with the addition of PSZ grinding media of 1.0 mm in diameter and 100 g of NMP as a solvent thereto, mixed for dispersion for 16 hours at 150 rpm with the use of a tumbling ball mill. Thus, secondary particles of the lithium titanate were crumbled to an average particle size $D_{50}$ of 0.8 µm. In this case, the secondary particles are not completely crumbled, but some particles are present in the form of secondary particles obtained from primary particles sintered or linked by melting and recrystallization.

Then, the solution with the respective materials dispersed as described above was, with the addition of 50 g of an NMP solution of 10 mass % polyvinylidene fluoride (from KUREHA CORPORATION, #7208) thereto, further mixed for 4 hours at 150 rpm with the use of a tumbling ball mill to prepare slurry for electrode (negative electrode) smoothing layer.

(Step 5) Preparation of Positive Electrode

The positive electrode active material slurry prepared in the above (Step 1) was applied to positive electrode collector foil of aluminum foil (from Tokai Toyo Aluminium Hanbai K.K., 20 µm in thickness), dried, and then pressed to prepare a positive electrode. Furthermore, an aluminum tab is attached to an exposed part of the positive electrode collector foil to prepare an extended electrode.

(Step 6) Preparation of Negative Electrode

The negative electrode active material slurry prepared in the above (Step 2) was applied to a negative electrode collector foil of rolled copper foil (from Nippon Foil Mfg. Co., Ltd., 10 µm in thickness), dried, and pressed to prepare a negative electrode. Furthermore, a nickel tab is attached to an exposed part of the negative electrode collector foil to prepare an extended electrode.

(Step 7) Preparation of Electrode (Positive Electrode) Smoothing Layer

The slurry for electrode (positive electrode) smoothing layers, prepared in the above (Step 3), was applied to the positive electrode prepared in the above (Step 5) to form an electrode (positive electrode) smoothing layer. It is to be noted that the electrode (positive electrode) smoothing layer is desirably formed to be, for example, 10 µm or less in thickness.

(Step 8) Preparation of Electrode (Negative Electrode) Smoothing Layer

The slurry for electrode (negative electrode) smoothing layers, prepared in the above (Step 4), was applied to the negative electrode prepared in the above (Step 6) to form an electrode (negative electrode) smoothing layer. It is to be noted that the electrode (negative electrode) smoothing layer is also desirably formed to be typically 10 µm or less in thickness.

(Step 9) Formation of Ceramic Separator Layer

In a 500 mL pot, 100 g of spherical alumina powder (from DENKI KAGAKU KOGYO KABUSHIKI KAISHA, average particle size $D_{50}$=0.3 µm) and 80 g of NMP as a solvent were put.

Further, with PSZ grinding media of 5 mm in diameter put therein, dispersion was achieved by mixing for 16 hours at 150 rpm with the use of a tumbling ball mill.

Thereafter, with 67.8 g of a binder solution (20 mass % NMP solution) of PVDF-HFP (from ARKEMA, Kynar #2850) put therein, slurry for ceramic separator layers with a PVC (pigment volume concentration) of 80% was prepared by mixing for 4 hours at 150 rpm with the use of a tumbling ball mill.

The prepared slurry for ceramic separator layers was applied with a bar coater onto the negative electrode including the electrode (negative electrode) smoothing layer prepared in the above (Step 8), and then dried to form a ceramic separator layer of 11 µm in film thickness.

(Step 10) Preparation of Battery Cell

Figure 2:
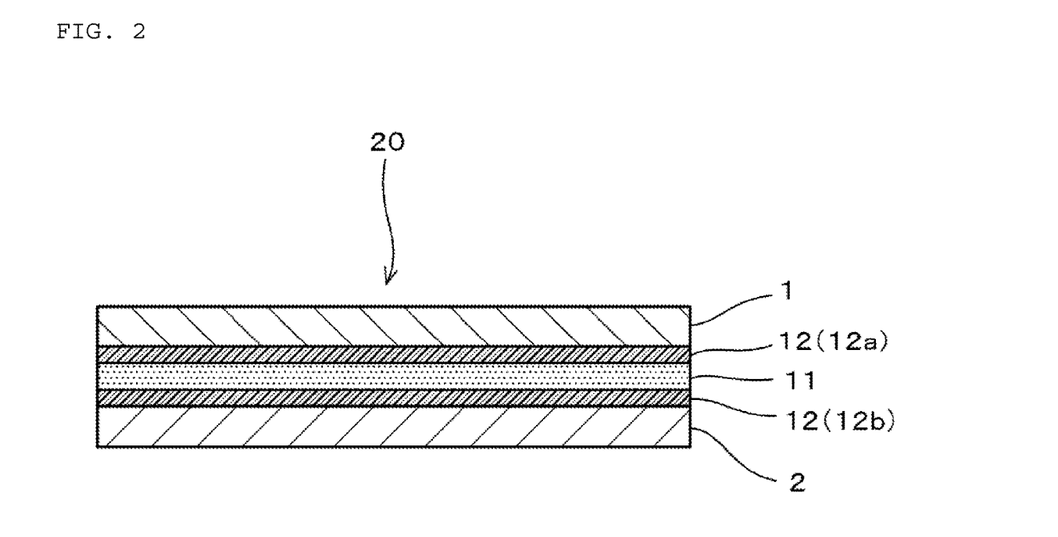
FIG. 2 is a diagram schematically illustrating a lithium ion secondary battery (battery element) according to Embodiment 2 of the present invention.

As schematically illustrated in FIG. 2, a battery element 20 including a pair of electrodes (positive electrode and negative electrode) was prepared by opposing the positive electrode 1 prepared in the above (Step 7), including the electrode (positive electrode) smoothing layer 12 (12a), and the negative electrode 2 prepared in the above (Step 9), including the electrode (negative electrode) smoothing layer 12 (12b) and the ceramic separator layer 11, and joining the electrodes in such a manner that the ceramic separator layer 11 was located between the electrode (positive electrode)

smoothing layer 12 (12a) and the electrode (negative electrode) smoothing layer 12 (12b).

Then, a laminated package (exterior) with an opening at one side was prepared by sandwiching the prepared battery element between two laminates, and making the three sides subjected to thermocompression bonding with an impulse sealer.

Next, an electrolyte solution was injected from the opening of the laminate into the package. As the electrolyte solution, an electrolyte solution was used which was obtained by dissolving lithium hexafluorophosphate (LiPF$_6$) for 1 M in a mixed solvent of ethylene carbonate (EC) and diethyl carbonate (DEC) at a volume ratio of 3:7.

Finally, the opening of the laminated package was vacuum-sealed to prepare a lithium ion secondary battery (battery cell).

<Characterization>

In order to evaluate the characteristics of the lithium ion secondary battery (battery cell) prepared in the way described above, whether any short-circuit fault had been caused or not was confirmed for ten lithium ion secondary batteries. For the determination of the short-circuit fault, the cell was charged up to 3.8 V, and left for one week, the voltage of the cell was measured, and the cell was regarded as a non-defective product when the voltage was 3.7 V or higher, or regarded as a short-circuit fault when the voltage was less than 3.7 V. The results are shown in Table 2.

In addition, for comparison, the same evaluation was also carried out on a lithium ion secondary battery prepared by the same method, except that the electrode (negative electrode and positive electrode) smoothing layers were not formed in the above (Step 7) and (Step 8) (a lithium ion secondary battery including only a ceramic separator layer between a positive electrode and a negative electrode). The results are shown together in Table 2.

TABLE 2

| Sample | Incidence of Short-Circuit Faults (Number of Short Circuits Caused/Number of Samples) |
| --- | --- |
| Lithium Ion Secondary Battery according to Embodiment 2 (Lithium Ion Secondary Battery including Ceramic Separator Layer and Electrode (Positive Electrode and Negative Electrode) Smoothing Layers) | 0/10 |
| Lithium Ion Secondary Battery for Comparison (Lithium Ion Secondary Battery including Only Ceramic Separator Layer, but including No Electrode Smoothing Layer) | 10/10 |

As shown in Table 2, in the case of the lithium ion secondary battery according to Embodiment 2 of the present invention, no short circuit was found to be caused in any of the ten lithium ion secondary batteries subjected to the evaluation.

On the other hand, in the case of the lithium ion secondary battery for comparison, a short circuit was found to be caused in all of the ten lithium ion secondary batteries subjected to the evaluation.

From the results mentioned above, it has been confirmed that when the electrode smoothing layers are formed on the surfaces of the positive electrode and negative electrode, the surfaces of the positive electrode and negative electrode are smoothed, thereby making it possible to prevent, with only the ceramic separator, any short-circuit fault from being caused, without using any porous polymer separator.

It is to be noted that while the ceramic separator layer is formed on the electrode (negative electrode) smoothing layer provided on the surface of the negative electrode in Embodiment 2, the ceramic separator layer may be formed on the electrode (positive electrode) smoothing layer provided on the surface of the positive electrode.

[Modification Example]

Figure 3:
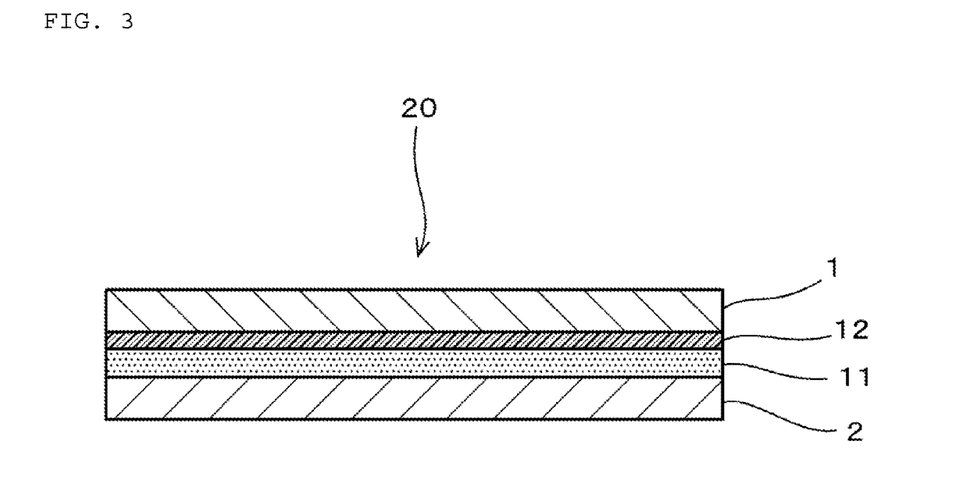
FIG. 3 is a diagram schematically illustrating a modification example of a lithium ion secondary battery (battery element) according to an embodiment of the present invention.

While a case of providing the electrode (negative electrode) smoothing layer only on the surface of the negative electrode has been described above in Embodiment 1, whereas a case of providing the electrode (positive electrode and negative electrode) smoothing layers on the surfaces of both the positive electrode and negative electrode has been described above in Embodiment 2, an electrode (positive electrode) smoothing layer 12 may be formed only on the surface of a positive electrode 1 as shown in FIG. 3 in some cases. It is to be noted that in FIG. 3, the parts denoted by the same reference numerals as those in FIGS. 1 and 2 refer to the same or corresponding parts.

It is to be noted that the present invention is not to be considered limited to the embodiments described above, but various applications and modifications can be made within the scope of the invention, in regard to the specific constituent materials and formation methods for the positive electrode, negative electrode, separator protection layer, and ceramic separator layer, and the type of the electrolyte solution, etc.

DESCRIPTION OF REFERENCE SYMBOLS 1 positive electrode
2 negative electrode
11 ceramic separator layer
12 (12a, 12b) electrode smoothing layer
20 battery element

The invention claimed is:

1. A lithium ion secondary battery comprising:
a positive electrode;
a negative electrode containing graphite;
a ceramic separator layer interposed between the positive electrode and the negative electrode, the ceramic separator layer formed from a composite material comprising insulating inorganic microparticles and a first organic substance and having lithium ion permeability; and
a negative electrode composite material layer comprising lithium titanate and a second organic substance, provided on a surface of the negative electrode, and interposed between the negative electrode and the ceramic separator layer.

2. The lithium ion secondary battery according to claim 1, further comprising:
a positive electrode composite material layer provided on a surface of the positive electrode, and interposed between the positive electrode and the ceramic separator layer.

3. The lithium ion secondary battery according to claim 2, wherein the positive electrode composite material layer comprises an active material and a third organic substance.

4. The lithium ion secondary battery according to claim 3, wherein the active material of the positive electrode composite material layer is the same as an active material of the positive electrode.

5. The lithium ion secondary battery according to claim 4, wherein the lithium titanate has a particle size of 0.03 to 5 μm.

6. The lithium ion secondary battery according to claim 5, wherein the active material has a particle size of 0.03 to 5 μm.

7. The lithium ion secondary battery according to claim 3, wherein the lithium titanate has a particle size of 0.03 to 5 μm.

8. The lithium ion secondary battery according to claim 7, wherein the active material has a particle size of 0.03 to 5 μm.

9. The lithium ion secondary battery according to claim 1, wherein the lithium titanate has a particle size of 0.03 to 5 μm.

\* \* \* \* \*